United States Patent
Ampunan et al.

(10) Patent No.: US 7,319,924 B2
(45) Date of Patent: Jan. 15, 2008

(54) METHOD AND SYSTEM FOR MANAGING PERSONALIZED SETTINGS IN A MOBILE VEHICLE

(75) Inventors: Nathan D. Ampunan, West Bloomfield, MI (US); Michael G. Zambo, Warren, MI (US)

(73) Assignee: General Motors Corporation, Detroit, MI (US)

( * ) Notice: Subject to any disclaimer, the term of this patent is extended or adjusted under 35 U.S.C. 154(b) by 246 days.

(21) Appl. No.: 10/970,946

(22) Filed: Oct. 22, 2004

(65) Prior Publication Data

US 2006/0089755 A1    Apr. 27, 2006

(51) Int. Cl.
G06F 7/00 (2006.01)

(52) U.S. Cl. ............................................. 701/1; 701/35

(58) Field of Classification Search .................... 701/1, 701/2, 36, 33, 29; 340/425.5; 307/9.1
See application file for complete search history.

(56) References Cited

U.S. PATENT DOCUMENTS

| 6,028,537 | A  * | 2/2000 | Suman et al. | 340/988 |
| 6,202,008 | B1 * | 3/2001 | Beckert et al. | 701/33 |
| 6,766,233 | B2 * | 7/2004 | Odinak et al. | 701/36 |

* cited by examiner

Primary Examiner—Yonel Beaulieu

(57) ABSTRACT

A method of managing personalized settings in a mobile vehicle, particularly during service replacement of a vehicle module, is provided. The personalized settings currently stored in the vehicle module are determined. The settings are first stored at a vehicle settings storage unit and then transferred to a replacement module. Systems and programs for managing personalized settings in a mobile vehicle are also provided.

13 Claims, 6 Drawing Sheets

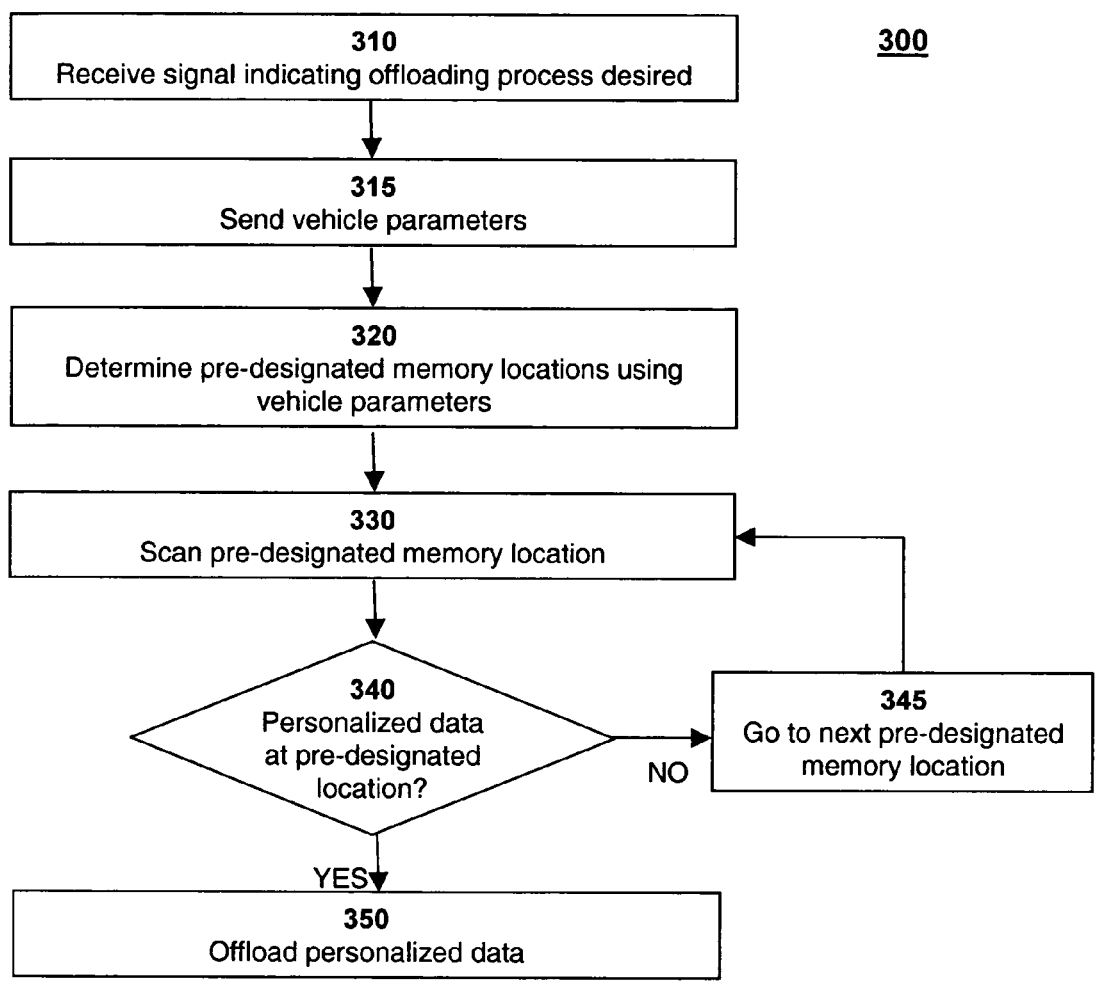

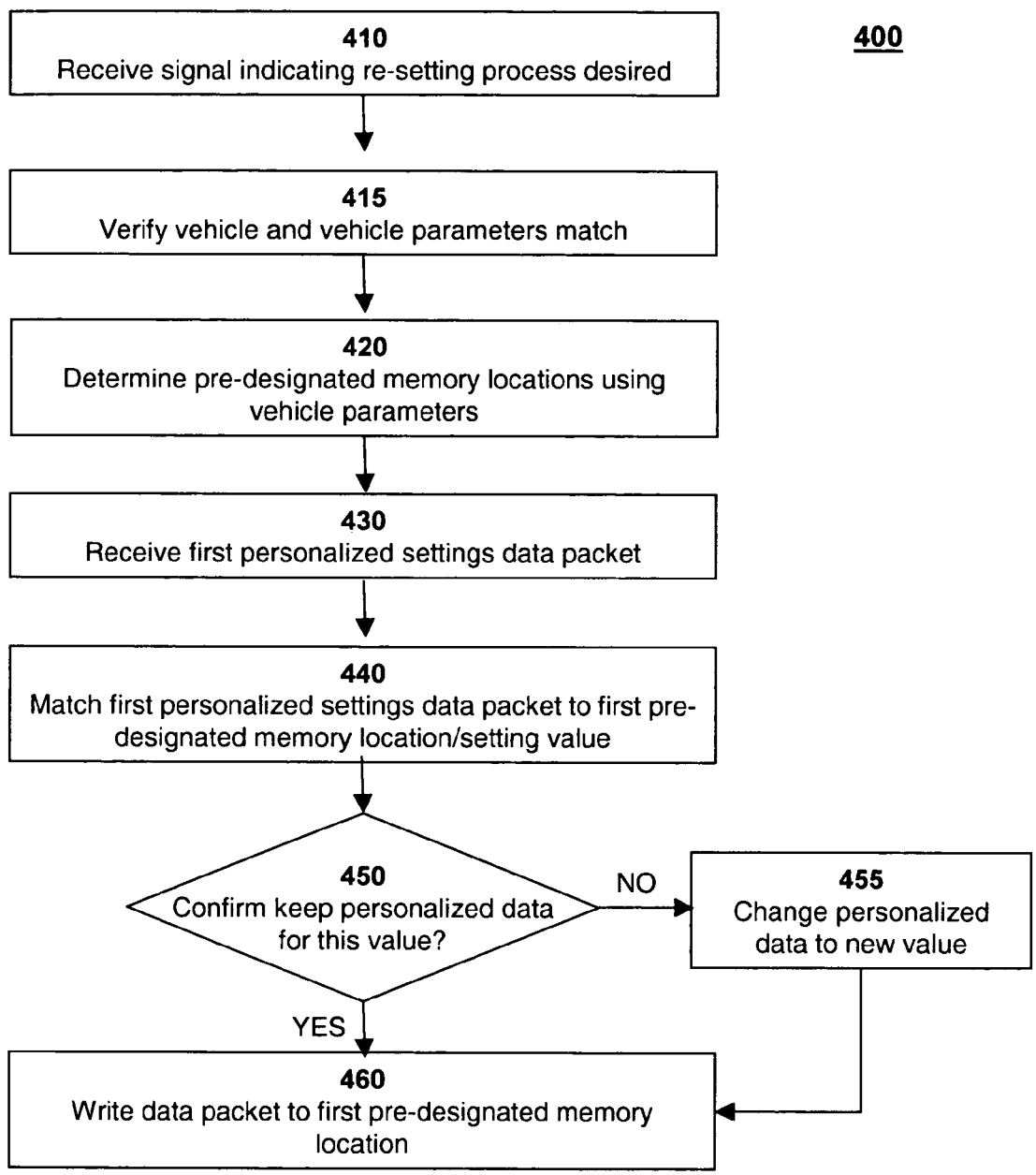

METHOD AND SYSTEM FOR MANAGING PERSONALIZED SETTINGS IN A MOBILE VEHICLE

FIELD OF THE INVENTION

This invention relates generally to personalized settings in a mobile vehicle communication system. Specifically, the invention relates to a method and system for persisting personalized settings in a mobile vehicle using a mobile vehicle communication system, particularly during a period of vehicle maintenance.

BACKGROUND OF THE INVENTION

Maintenance and repair are necessary during the life of a mobile vehicle in order to keep the vehicle functioning properly. Each operational system of a mobile vehicle is generally controlled by a specific electronic control, referred to as a "module." Some examples of operational systems include body control system, radio control system, remote function activation (RFA) system and the heating, ventilating and air conditioning (HVAC) system. Maintenance and repair of a given operational system therefore, may also involve working with the electronic control module for that system. In some instances, a module may be determined to be bad. Repair is accomplished by replacing the bad module.

Currently, if the bad module keeps settings that have been personalized, these setting are lost once the bad module is replaced with a new module. In some cases personalization settings are irretrievable when communication cannot be established with a module. It is desirable for customer satisfaction to keep many of these settings as they were before the vehicle repair. For example, some typical personalized settings in the body control module (BCM) include a setting for the length of time that the light on is delayed (i.e., delay light for 30, 60 or 90 seconds) and settings for when doors should be locked or unlocked (i.e. unlock doors when vehicle is in park or lock doors when vehicle is at a certain speed or lock doors according to child proof lock settings). Other settings include preferred radio stations, current local time, equalization, fade, treble level and bass level in the radio control module. Other personalized settings include preferred settings for the RFA such as door lock personalization settings (e.g. unlock one door or all doors) and automatic positioning settings for the driver's seat. Clock settings and compass calibrations for the customer's region are other examples of personalized settings that may be lost with replacement of a bad module.

The repair service and/or dealer must then manually reset whatever settings can be reset. In some cases, the customer loses all personalized settings. Furthermore, in some cases, the personalized settings are irretrievable when communication cannot be established with a particular module.

Certain settings, such as vehicle safety settings, theft protection settings and driving operation control settings, are stored in secured memory. These settings persist whatever module is replaced. However, secured memory is limited and expensive and is used for the vital settings detailed above. Little or no secured memory is left to store personalized vehicle settings.

Accordingly, it would be desirable to have a system and method for managing and persisting personalized settings in a mobile vehicle using a mobile vehicle communication system. It would be desirable to implement this system and method at the time of vehicle maintenance It is an object of this invention, therefore, to provide a method for persisting personalized vehicle settings at the time of vehicle maintenance, and to overcome the obstacles described above.

SUMMARY OF THE INVENTION

One aspect of the invention is a method of managing personalized settings in a mobile vehicle, particularly during service replacement of a vehicle module. The personalized settings currently stored in the vehicle module are determined. The settings are first stored at a vehicle settings storage unit and later transferred to a replacement module. A telematics module may communicate with the vehicle module to determine the personalized settings. A predesignated memory location for the personalized settings in the vehicle module may also be determined and the settings may later be transferred to a matching predesignated memory location in the replacement module. Alternatively a new value of the personalized settings may be entered and transferred to the matching predesignated memory location. Identifying parameters of the vehicle module to be re-set may be determined for proper matching.

Another aspect of the invention is a system for managing personalized settings in a mobile vehicle, particularly during service replacement of a vehicle module. The system includes means for determining personalized settings stored in the vehicle module, means for storing the personalized settings at a vehicle settings storage unit and means for transferring the personalized settings to a replacement module. The system may also include means for communicating with the vehicle module via a telematics unit to determine the personalized settings. The system may also include means for determining a predesignated memory location for the personalized settings in the vehicle module and means for transferring the personalized settings to a matching predesignated memory location in the replacement module. The system may further include means for entering a new value of the personalized settings as well as means for transferring the new value of the personalized settings to the replacement module. The system may further include means for determining identifying parameters of the vehicle module.

Yet another aspect of the invention is a computer usable medium including a program to manage personalized settings in a mobile vehicle particularly during service replacement of a vehicle module. The program includes computer program code that determines personalized settings stored in the vehicle module, computer program code that stores the personalized settings at a vehicle settings storage unit and computer program code that transfers the personalized settings to a replacement module. The program may also include computer program code that communicates with the vehicle module via a telematics unit to determine the personalized settings. The program may also include computer program code that determines a predesignated memory location for the personalized settings in the vehicle module and computer program code that transfers the personalized settings to a matching predesignated memory location in the replacement module. The program may further include computer program code that enters a new value of the personalized settings as well as computer program code that transfers the new value of the personalized settings to the replacement module. The program may further include computer program code that determines identifying parameters of the vehicle module.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 illustrates a method of persisting personalized vehicle settings in accordance with one embodiment of the present invention; and FIG. 4 illustrates a method of persisting personalized vehicle settings in accordance with another embodiment of the present invention.

DETAILED DESCRIPTION OF THE PRESENTLY PREFERRED EMBODIMENTS

Figure 1:
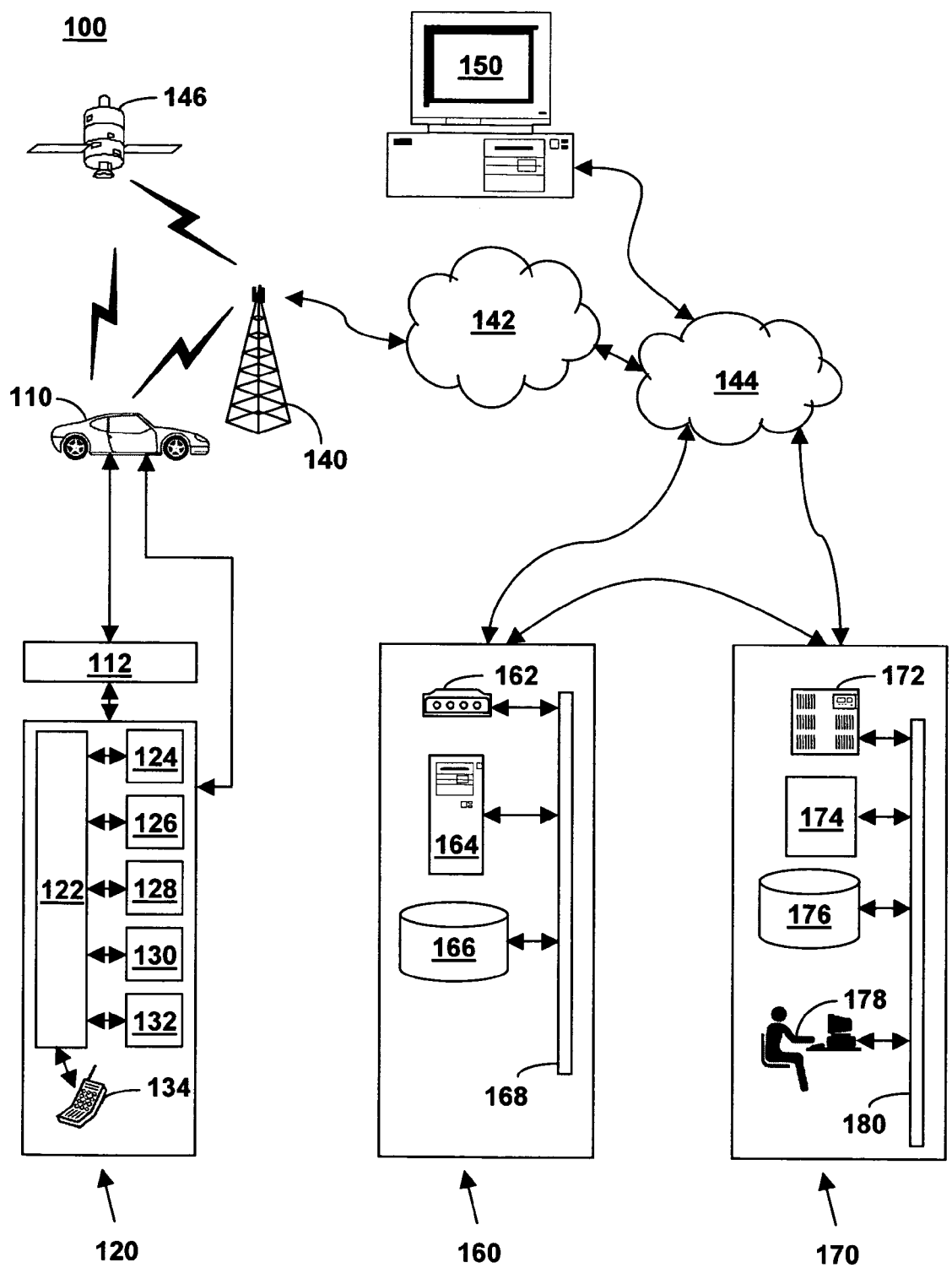
FIG. 1 illustrates a mobile vehicle communication system for persisting personalized vehicle settings, in accordance with one embodiment of the present invention.

FIG. 1 illustrates one embodiment of a mobile vehicle communication system (MVCS) 100 for controlling vehicle modules. MVCS 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more vehicle call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, activating a remote alert (e.g. honking the horn and/or flashing the lights), setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization (ISO) Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142. MVCU 110 may also send and receive digital satellite content from satellite broadcast system 146.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module. In one embodiment of the invention, telematics unit 120 is used to persist vehicle settings from another vehicle module so that the settings of the other module are not lost once the module is replaced.

In one embodiment, processor 122 is implemented as a microcontroller, controller, host processor, or vehicle communications processor. In one embodiment, processor 122 is a digital signal processor. In another embodiment, processor 122 is implemented as an application-specific integrated circuit. In another embodiment, processor 122 is implemented as a processor working in conjunction with a central processing unit performing the function of a general-purpose processor.

GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone. Processor 122 executes various computer programs that control programming and operational modes of electronic and mechanical systems within MVCU 110. Processor 122 controls communications (e.g., call signals) between telematics unit 120, wireless carrier system 140, and vehicle call center 170. Additionally, processor 122 controls reception of communications from satellite broadcast system 146.

In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate programming modes and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signals over part of or the entire communication path. Wireless carrier system 140 may be implemented as any type of broadcast communication in addition to satellite broadcast system 146.

Alternatively, wireless carrier system 140 may provide broadcast communication to satellite broadcast system 146 for download to MVCU 110. For example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. For example, satellite broadcast system 146 may broadcast over a spectrum in the "S" band of 2.3 GHz that has been allocated by the U.S. Federal Communications Commission for nationwide broadcasting of satellite-based Digital Audio Radio Service (SDARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by vehicle call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and vehicle call center 170. In one embodiment, land network 144 is a public-switched telephone network. In another embodiment, land network 144 is implemented as an Internet protocol (IP) network. In other embodiments, land network 144 is implemented as a wired network, an optical network, a fiber network, a wireless network, or a combination thereof. Land network 144 is connected to one or more landline telephones. Communication network 142 and land network 144 connect wireless carrier system 140 to web-hosting portal 160 and vehicle call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol, or transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. In one embodiment, a user may alter preferences via a computer 150.

User-preference data from client-side software is transmitted to server-side software of web-hosting portal 160. In an example, user-preference data is stored at web-hosting portal 160. Web-hosting portal 160 includes one or more data modems 162, one or more web servers 164, one or more databases 166, and a network system 168. Web-hosting portal 160 is connected directly by wire to vehicle call center 170, or connected by phone lines to land network 144, which is connected to vehicle call center 170. In an example, web-hosting portal 160 is connected to vehicle call center 170 utilizing an IP network. In this example, both components, web-hosting portal 160 and vehicle call center 170, are connected to land network 144 utilizing the IP network. In another example, web-hosting portal 160 is connected to land network 144 by one or more data modems 162. Land network 144 sends digital data to and receives digital data from data modem 162, data that is then transferred to web server 164. Data modem 162 may reside inside web server 164. Land network 144 transmits data communications between web-hosting portal 160 and vehicle call center 170.

Web server 164 receives user-preference data from user computer 150 via land network 144. Computer 150 may include a wireless modem to send data to web-hosting portal 160 through a wireless communication network 142 and a land network 144. Data is received by land network 144 and sent to one or more web servers 164. Web server 164 may be implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings In one embodiment, the telematics unit 120 directed by processor 122 may upload personal preference settings to one or more web servers 164, storing the data in one or more databases 166. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to vehicle call center 170 through land network 144.

Vehicle call center 170 is a location where many calls are received and serviced at the same time, or where many calls are sent at the same time. In one example, the call center is a telematics call center, facilitating communications to and from telematics unit 120 in MVCU 110. In another example, the call center is a voice call center, providing verbal communications between an advisor in the call center and a subscriber in a mobile vehicle. In another example, the call center contains each of these functions. In other embodiments, vehicle call center 170 and web-hosting portal 160 are located in the same or different facilities.

Vehicle call center 170 contains one or more voice and data switches 172, one or more communication services managers 174, one or more communication services databases 176, one or more communication services advisors 178, and one or more network systems 180.

Switch 172 of vehicle call center 170 connects to land network 144. Switch 172 transmits voice or data transmissions from vehicle call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, communications assistance and digital satellite content management. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

Communication services advisor 178 may be implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from vehicle call center 170. In one embodiment, the call is routed to telematics unit 120 from vehicle call center 170 via land network 144, communication network 142, and wireless carrier system 140. In another embodiment, an outbound communication is routed to telematics unit 120 from vehicle call center 170 via land network 144, communication network 142, wireless carrier system 140, and satellite broadcast system 146. In this embodiment, an inbound communication is routed to vehicle call center 170 from telematics unit 120 via wireless carrier system 140, communication network 142, and land network 144.

Figure 2A:
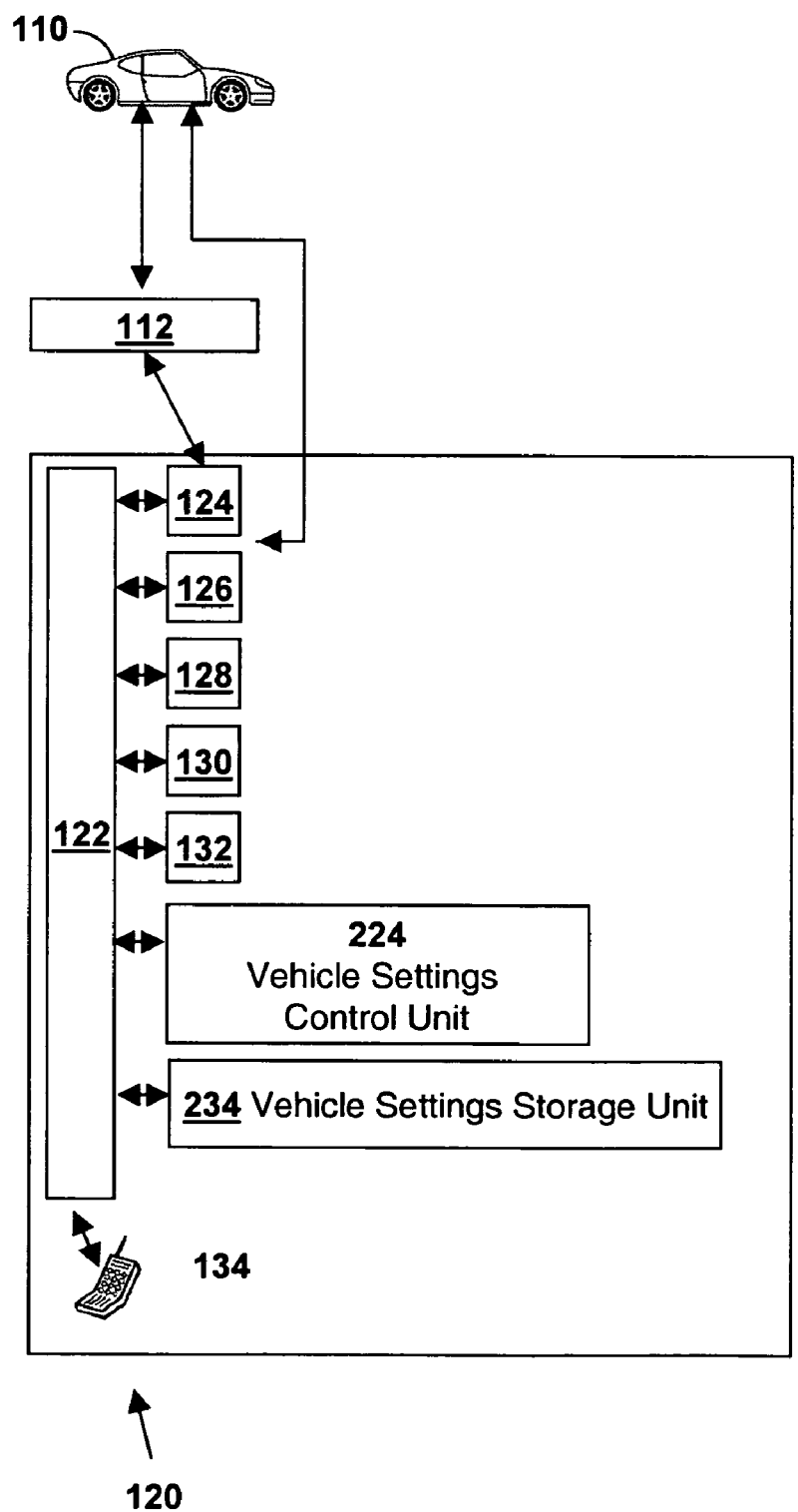
FIG. 2a illustrates a system for persisting personalized vehicle settings in accordance with one embodiment of the present invention.
Figure 2B:
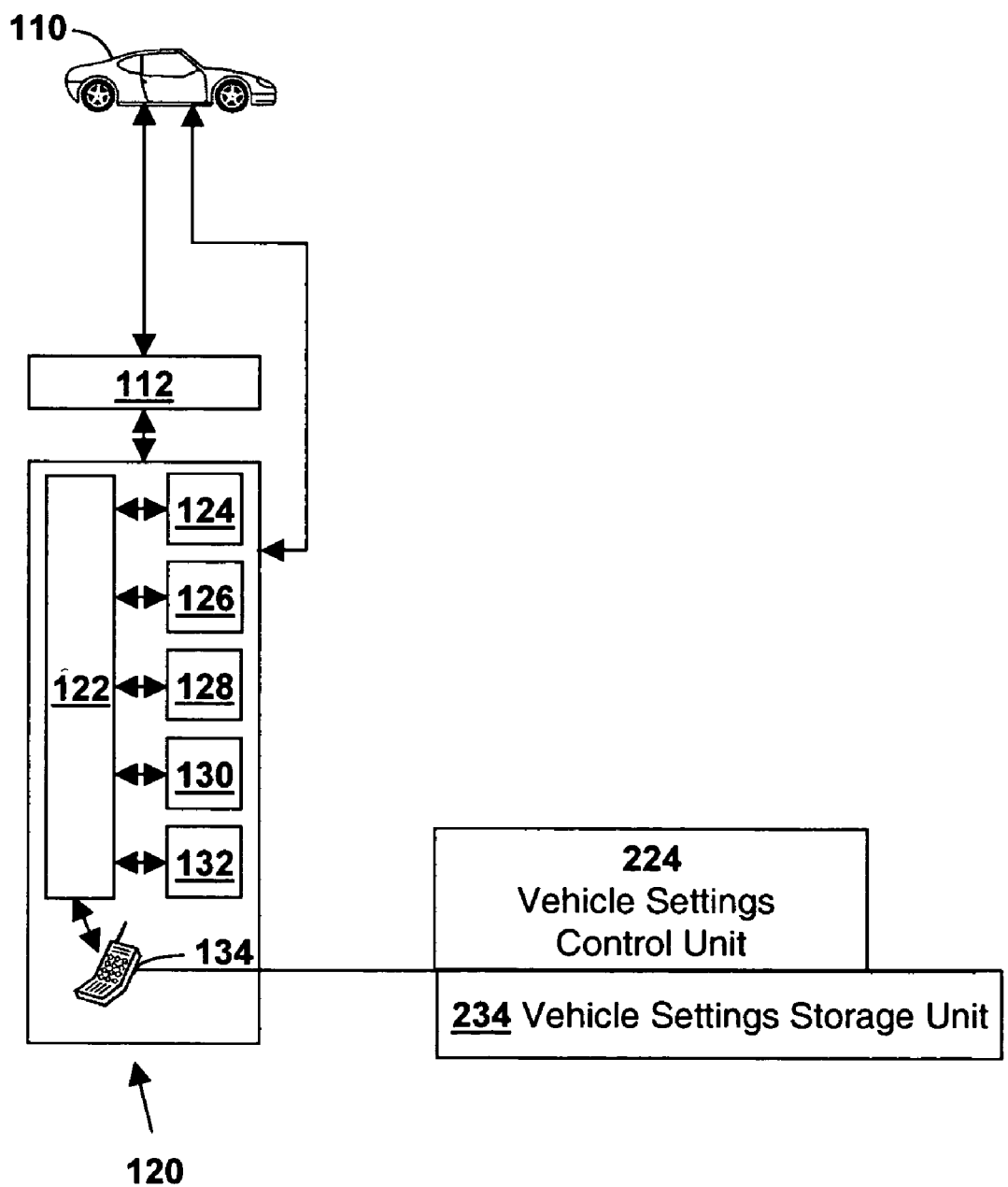
FIG. 2b illustrates a system for persisting personalized vehicle settings in accordance with a second embodiment of the present invention.
Figure 2C:
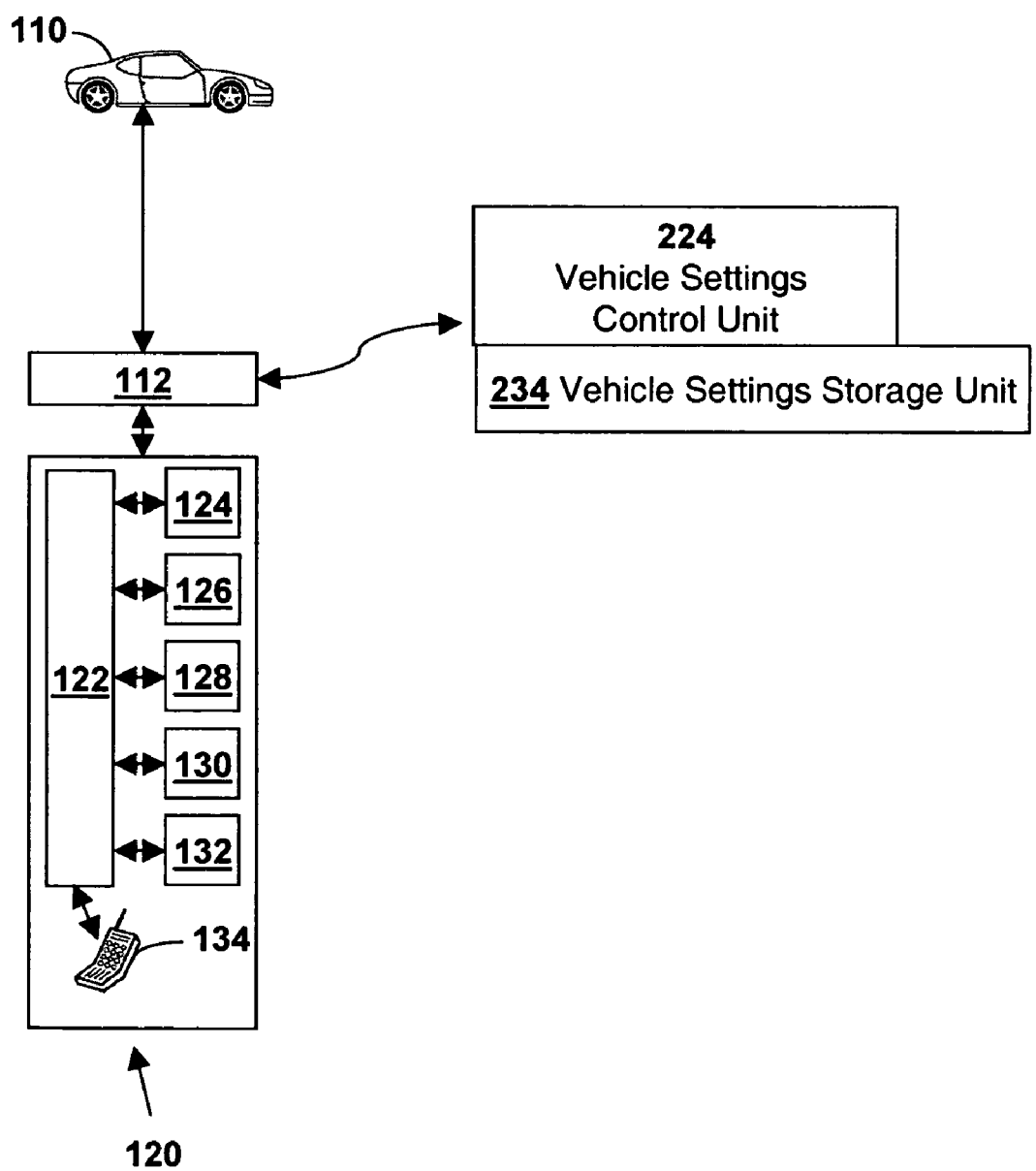
FIG. 2c illustrates a system for persisting personalized vehicle settings in accordance with a third embodiment of the present invention.

FIGS. 2a through 2c illustrate a vehicle settings management (VSM) system 200 in accordance with another embodiment of the current invention. The components shown in FIGS. 2a through 2c may also be used in conjunction with one or more of the components of mobile vehicle communication system 100, above.

VSM system 200 includes a vehicle network 112 and telematics unit 120 as well as one or more of their separate components, as described above. VSM 200 further comprises a vehicle settings control unit (VSCU) as well as a vehicle settings storage unit (VSSU).

As seen in FIG. 2a, both VSCU 224 and VSSU 234 may be resident in telematics unit 120. As seen in FIG. 2b, VSCU 224 and VSSU 234 may also be in wireless or wired communication with telematics unit 120, while remaining physically separate from telematics unit 120. For example, VSCU 224 and VSSU 234 may reside at call center 170. As seen in FIG. 2c, VSCU 224 and VSSU 234 may be resident in MVCU 110 as their own separate module. Such a module could be in communication with telematics unit 120 via vehicle network 112. VSCU 224 may be connected as one unit with VSSU 234 as seen in FIGS. 2b and 2c or may be separated from, but in communication with, VSCU 234.

VSCU 224 is any suitable processor for receiving and managing data from VSSU 234 and telematics unit 120 and/or various components of telematics unit 120. VSCU 224 executes various computer programs that may read, process and store information such as the programming and operational modes and settings of electronic and mechanical systems within a given vehicle module.

In one embodiment of the invention, repair personnel uses telematics unit 120 to communicate with VSCU 224 and indicate that a vehicle module will be replaced. VSCU 224 through telematics unit 120 receives additional information about the specific vehicle module, such as parameters that describe the specific vehicle module. These parameters include the mobile vehicle's make, model, year and a name of the module. VSCU 224 processes these parameters to determine the memory locations for personalized vehicle settings in the specific vehicle module. VSCU 224 then controls scanning and downloading of the settings data at these locations. VSCU 224 also controls scanning uploading of settings data at memory locations in the replacement module.

VSSU 234 is any suitable location for storing information processed by VSCU 224. Such information includes, but is not limited to, programming and operational modes and settings of electronic and mechanical systems within one or more vehicle modules, parameters describing vehicle modules (such as the examples listed above), specific memory locations within one or more vehicle modules and information necessary for VSCU 224 to function appropriately.

FIG. 3 illustrates a method 300 of persisting personalized vehicle settings in a mobile vehicle communication system in accordance with one embodiment of the current invention. Although the steps described in method 300 are shown in a given order, the steps are not limited to the order illustrated. The method 300 may be performed, for example, when a vehicle is brought in for repair, before a bad module is removed from the vehicle.

As seen at block 310, VSCU 224 receives a signal that the offloading of personalized settings data from a given vehicle module is desired. This signal may be sent to VSCU 224 via telematics unit 120. In one embodiment, repair personnel press a button on telematics unit 120 to initiate communication with VSCU 224.

As seen at block 315, VSCU 224 sends parameters describing the vehicle via telematics unit 120. Such parameters include the mobile vehicle's make, model, year, a number identifying the vehicle (Vehicle Identification Number or VIN) and a name of the module to be replaced. These parameters may be sent, for example, to call center 170 to help identify the vehicle and module. These parameters may be used, as detailed below, in order to process and persist the personalized settings properly.

As seen at block 320, VSCU 224 determines predesignated memory locations for the given vehicle module. These predesignated memory locations may be determined using parameters such as the mobile vehicle's make, model, year and a name of the module to be replaced. The predesignated locations may have been designated for storage of personalized settings at the time of the vehicle's creation. In one embodiment, repair personnel send such parameters to VSCU 224 via telematics unit 120. VSCU 224 may also communicate with call center 170 to help determine the proper predesignated memory locations for a given module and/or vehicle. These parameters may be determined, for example, by reviewing written information regarding the module in question. Such written information may be sent to VSCU 224 for determination from call center 170 or from other appropriate locations within mobile vehicle communication system 100.

As seen at block 330, VSCU 224 then scans these predesignated locations for personalized data. VSCU 224 may accomplish this, for example, by reading the locations that have been identified at step 320.

As seen at block 340, VSCU 224 then determines if there is data at a predesignated location.

As seen at block 350, if VSCU 224 finds data at a pre-designated location, VSCU 224 proceeds to process the personalized settings data, for example by downloading the data for storage to VSSU 234.

As seen at block 345, if VSCU 224 does not find data at a pre-designated location, VSCU 224 moves on to the next pre-designated location. Steps 330, 340, 345 and 350 may be repeated until all pre-designated locations determined at block 310 have been examined for personalized settings and all personalized settings have been downloaded to VSSU 234.

FIG. 4 illustrates a method 400 of persisting personalized vehicle settings in a mobile vehicle communication system in accordance with another embodiment of the current invention. Although the steps described in method 400 are shown in a given order, the steps are not limited to the order illustrated. The method 400 may be performed, for example, after a vehicle has been repaired, when a replacement module has already been placed in the vehicle. Repair personnel may initiate the method 400 while the vehicle is still at the repair facilities. Alternatively, the owner of the vehicle may also initiate the method 400 at any time after the module has been replaced, for example, after having driven the vehicle home.

As seen at block 410, VSCU 224 receives a signal indicating that a process of re-setting personalized vehicle settings should be initiated for a particular vehicle module that has now been replaced. This signal may be sent to VSCU 224 via telematics unit 120. In one embodiment, repair personnel press a button on telematics unit 120 to initiate communication with VSCU 224. Alternatively, the client may initiate communication with VSCU 224.

As seen at block 415, VSCU 224 matches the vehicle module to be re-set with the settings from the previous/replaced module. VSCU 224 may accomplish this for example by communicating with call center 170 via telematics unit 120. For example, call center 170 may provide VSCU 224 with a list of recently replaced vehicle modules and their associated saved settings. Thus, the user may choose the module for which personalized settings should be re-loaded/re-set. Alternatively, VSCU 224 may send vehicle parameters describing the vehicle module to be re-set via telematics unit 120. Such parameters include the mobile vehicle's make, model, year, a number identifying the vehicle (Vehicle Identification Number or VIN) and a name of the module to be replaced. These parameters may be sent, for example, to call center 170 to help identify the vehicle and module. These parameters may be used, as detailed below, in order to re-set the desired personalized settings.

As seen at block 420, VSCU 224 determines pre-designated memory locations for the replacement module. These pre-designated memory locations may be determined using parameters such as the mobile vehicle's make, model, year and a name of the module to be replaced. The pre-designated locations may have been designated for storage of personalized settings at the time of the vehicle's creation or may be based on the pre-designated locations of the previous vehicle module that was removed (determined, for example at step 320 of method 300 above.) In one embodiment, repair personnel send such parameters to VSCU 224 via telematics unit 120.

As seen at block 430, VSCU 224 then receives the first personalized settings data packet. This data may be, for example, specific personalized data stored in VSSU 434. Such data may have been stored at step 350 of method 300 above.

As seen at block 440, VSCU 224 then matches the first personalized settings data packet to a first pre-designated memory location. That is, VSCU 224 determines a memory location in the replacement module and checks if the data may be matched to that location. For example, VSCU 224 may find the memory location for radio station preferences at a first location and the memory location for lights off settings at a second location at block 410. VSCU 224 may then receive a data packet at block 430 that comprises the previous radio station preferences. At block 440, VSCU 224 matches the data packet to the found radio station preferences at the first memory location.

If the data packet does not match the found memory location, the process may then abort or re-start. For example, if VSCU 224 finds the memory location for radio station preferences at block 410 and then receives a data packet at block 430 that comprises the previous lights off settings, the technician may have installed an incorrect component. Saving the wrong data packet to the wrong predesignated location may cause undesirable results.

As seen at block 450, once the data packet is matched to its proper pre-designated memory location, VSCU 224 sends a signal requesting confirmation of the personalized data settings stored in the packet. VSCU 224 may send this signal, for example, to telematics unit 120. The user may use telematics unit 120 to confirm that the data is correct and should be kept.

As seen at block 460, if the user confirms the data, VSCU 224 writes the personalized settings data packet to the first pre-designated location.

As seen at block 455, if the user wishes to change the value of the settings, the user may enter new personalized data settings (e.g. change the lights off time setting to 30 seconds instead of 60). The user may enter the new settings via telematics unit 120. The method 400 may then proceed to block 460 where VSCU 224 writes the changed settings to the first pre-designated memory location.

Steps 440, 450, 355 and 460 may be repeated until all data packets have been matched to appropriate predesignated memory locations in the replacement module.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of managing personalized settings in a mobile vehicle during service replacement of a first vehicle module with a second vehicle module, comprising:
    determining identifying parameters of the first vehicle module;
    determining a predesignated memory location for the personalized settings in the first vehicle module;
    determining the personalized settings stored in the first vehicle module;
    storing the personalized settings at a vehicle settings storage unit; and
    transferring the personalized settings to a generally matching predesignated memory location in the second vehicle module so that the personalized settings persist through the replacement of the first vehicle module with the second vehicle module.

2. The method of claim 1, further comprising:
    communicating with the first vehicle module via a telematics unit to determine the personalized settings.

3. The method of claim 1, further comprising:
    entering a new value of the personalized settings.

4. The method of claim 3, further comprising:
    transferring the new value of the personalized settings to the second vehicle module.

5. A system for managing personalized settings in a mobile vehicle during service replacement of a first vehicle module with a second vehicle module, comprising:
    means for determining identifying parameters of the first vehicle module;
    means for determining a predesignated memory location for the personalized settings in the first vehicle module;
    means for determining the personalized settings stored in the first vehicle module;
    means for storing the personalized settings at a vehicle settings storage unit; and
    means for transferring the personalized settings to a generally matching predesignated memory location in the second vehicle module so that the personalized settings persist through the replacement of the first vehicle module with the second vehicle module.

6. The system of claim 5, further comprising:
    means for communicating with the first vehicle module via a telematics unit to determine the personalized settings.

7. The system of claim 5, further comprising:
    means for entering a new value of the personalized settings.

8. The system of claim 7, further comprising:
    means for transferring the new value of the personalized settings to the second vehicle module.

9. A method of managing personalized settings in a mobile vehicle during service replacement of a vehicle module, comprising:
    receiving a signal at a telematics unit on a vehicle indicating that a vehicle module is to be replaced;
    retrieving personalized settings data for the vehicle module;
    storing the personalized settings data in a location other than the vehicle module;
    replacing the vehicle module with a replacement module; and thereafter
    receiving a signal requesting resetting of the personalized settings data;
    retrieving the stored personalized settings data; and
    re-loading the personalized settings data for the replacement module.

10. The method of claim 9, wherein the storing step further comprises transmitting the personalized settings data from the telematics unit to a remote facility, and wherein the step of retrieving the stored personalized settings data further comprises transmitting the stored personalized settings data from the remote facility back to the telematics unit.

11. The method of claim 9, wherein the storing step further comprises storing the personalized data settings in another module within the vehicle, and wherein the step of retrieving the stored personalized settings data further comprises accessing the stored personalized settings data from the other module.

12. The method of claim 11, wherein the other module comprises the telematics unit.

13. The method of claim 9, wherein the step of receiving a signal at the telematics unit further comprises detecting press of a button on the telematics unit and receiving an indication of the vehicle module to be replaced.

* * * * *